United States Patent
Oteri et al.

(10) Patent No.: US 11,671,225 B2
(45) Date of Patent: Jun. 6, 2023

(54) CONTROL AND OPERATION IN WIRELESS LOCAL AREA NETWORK

(71) Applicant: INTERDIGITAL PATENT HOLDINGS, INC., Wilmington, DE (US)

(72) Inventors: Oghenekome Oteri, San Diego, CA (US); Hanqing Lou, Syosset, NY (US); Frank La Sita, Setauket, NY (US); Fengjun Xi, San Diego, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 98 days.

(21) Appl. No.: 17/239,075

(22) Filed: Apr. 23, 2021

(65) Prior Publication Data

US 2021/0243787 A1    Aug. 5, 2021

Related U.S. Application Data

(63) Continuation of application No. 16/069,908, filed as application No. PCT/US2017/013326 on Jan. 13, 2017, now Pat. No. 11,019,650.

(Continued)

(51) Int. Cl.
  *H04L 5/00* (2006.01)
  *H04W 52/36* (2009.01)
  (Continued)

(52) U.S. Cl.
  CPC ......... *H04L 5/0053* (2013.01); *H04B 17/318* (2015.01); *H04L 1/0006* (2013.01);
  (Continued)

(58) Field of Classification Search
  None
  See application file for complete search history.

(56) References Cited

U.S. PATENT DOCUMENTS 10,349,388 B2 * 7/2019 Chun ............... H04W 28/10
2002/0168993 A1   11/2002 Choi et al.
(Continued)

FOREIGN PATENT DOCUMENTS

EP     2 874 459        5/2015
WO     2015/031439 A1   3/2015
(Continued)

OTHER PUBLICATIONS

Aboul-MAGD, "802.11 HEW SG Proposed PAR," IEEE 802.11-14/0165r1 (Mar. 17, 2014).
(Continued)

*Primary Examiner* — Phirin Sam
(74) *Attorney, Agent, or Firm* — Volpe Koenig

(57) ABSTRACT

Systems, methods, and instrumentalities are disclosed for range extension, basic service set (BSS) color labeling, and multi-user (MU) fragmentation and control in WLANs. A range extension notification/enablement scheme, a clear channel assessment (CCA), a headroom indication, and/or power scaling may be provided for a range extension mode. BSS color may be provided for multiple-BSSs under an access point (AP). Uplink (UL) transmission may be provided with different fragmentation capabilities. A high-efficiency (HE) trigger-based UL NDP physical layer convergence protocol (PLCP) protocol data unit (PPDU) frame may be provided. A station (STA) may receive a trigger frame comprising a null data packet (NDP) indication and a trigger type. The STA may determine that the STA is an intended recipient of the trigger frame. The STA may
(Continued)

prepare an NDP PPDU for a control frame and/or a management frame based on the trigger type.

18 Claims, 20 Drawing Sheets

Related U.S. Application Data

(60) Provisional application No. 62/278,558, filed on Jan. 14, 2016.

(51) Int. Cl.
*H04B 17/318* (2015.01)
*H04W 72/21* (2023.01)
*H04L 1/00* (2006.01)
*H04W 52/24* (2009.01)
*H04L 27/26* (2006.01)
*H04W 84/12* (2009.01)

(52) U.S. Cl.
CPC ......... *H04L 27/2602* (2013.01); *H04W 52/24* (2013.01); *H04W 52/245* (2013.01); *H04W 52/365* (2013.01); *H04W 72/21* (2023.01); *H04L 27/2603* (2021.01); *H04W 84/12* (2013.01)

(56) References Cited

U.S. PATENT DOCUMENTS

| | | | |
|---|---|---|---|
| 2013/0194988 A1 | 8/2013 | Kubota et al. | |
| 2014/0146678 A1 | 5/2014 | Merlin et al. | |
| 2014/0269635 A1 | 9/2014 | Shapira et al. | |
| 2015/0063209 A1 | 3/2015 | Cherian et al. | |
| 2015/0063335 A1 | 3/2015 | Cherian et al. | |
| 2015/0124689 A1 | 5/2015 | Merlin et al. | |
| 2016/0100408 A1 | 4/2016 | Hedayat | |
| 2016/0119933 A1 | 4/2016 | Merlin et al. | |
| 2016/0143026 A1 | 5/2016 | Seok | |
| 2016/0302229 A1 | 10/2016 | Hedayat | |
| 2016/0330732 A1 | 11/2016 | Moon et al. | |
| 2017/0070914 A1* | 3/2017 | Chun | H04L 5/0053 |
| 2017/0079027 A1 | 3/2017 | Chun et al. | |
| 2017/0272138 A1* | 9/2017 | Chun | H04L 69/323 |
| 2017/0289911 A1* | 10/2017 | Kim | H04W 72/0446 |
| 2018/0138959 A1 | 5/2018 | Chun et al. | |
| 2018/0220443 A1 | 8/2018 | Kim et al. | |
| 2018/0249501 A1* | 8/2018 | Ko | H04W 84/12 |
| 2018/0359761 A1 | 12/2018 | Chun et al. | |
| 2019/0140728 A1 | 5/2019 | Moon et al. | |
| 2019/0149210 A1 | 5/2019 | Seok | |
| 2019/0268914 A1* | 8/2019 | Adachi | H04L 5/0053 |
| 2019/0326975 A1 | 10/2019 | Yu et al. | |
| 2019/0364560 A1 | 11/2019 | Chun et al. | |
| 2019/0364577 A1 | 11/2019 | Hedayat | |
| 2020/0044699 A1 | 2/2020 | Park et al. | |

FOREIGN PATENT DOCUMENTS

| | | |
|---|---|---|
| WO | 2015/031466 | 3/2015 |
| WO | 2015/038285 | 3/2015 |
| WO | 2016/069729 | 5/2016 |
| WO | 2017/044529 | 3/2017 |

OTHER PUBLICATIONS

Aboul-MAGD, "IEEE 802.11 HEW SG Proposed CSD," IEEE 802.11-14/0169r0 (Jan. 22, 2014).
Asterjadhi et al., "Fragmentation for MU frames—Follow," 802.11-15/1318r0 (Nov. 15, 2015).
Asterjadhi et al., "Identifiers in HE PPDUs for power saving," IEEE 802.11-15/1122r0 (Sep. 12, 2015).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 6: Enhancements for High Efficiency WLAN, IEEE P802.11ax/D1.0 (Nov. 2016).
Ghosh et al., "Fragmentation with MU Operation," IEEE802.11-15/1102r0 (Sep. 14, 2015).
Hiertz et al., "Multiple BSSID element," 802.11-2015/1014r0 (Aug. 1, 2015).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE P802.11ah/D5.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
Khorov et al., "Multiple NAVs for Spatial Reuse," IEEE 802.11-15/1348 (Nov. 9, 2015).
Li et al., "ax Channel Access rule," IEEE 802.11-15/1063r0 (Sep. 10, 2015).
Lv et al., "TA address field in Trigger Frame," 802.11-15/1389r0 (Nov. 6, 2015).
Moon et al., "Sounding for Uplink Transmission," IEEE 802.11-15/1349r0 (Nov. 19, 2015).
Noh et al., "Considerations on Range Extension with SIG-A Repetition," IEEE 802.11-15/1091r0 (Sep. 13, 2015).
Stacey, "Specification Framework for TGax," IEEE 802.11-15/0132r12 (Dec. 1, 2015).
Stacey, "Specification Framework for TGax," IEEE 802.11-15/0132r13 (Dec. 7, 2015).
Vermani et al., "Extended Range Support for 11ax," IEEE 802.11-15/1309r1 (Nov. 9, 2015).
Zhang et al., "HE-SIGA transmission for range extension," IEEE 802.11-15/0826r3 (Jul. 12, 2015).
Lukaszewski et al., "BSS Color Field Size Measurements," IEEE 802.11-15/1336r1 (Nov. 8, 2015).
Fischer et al., "CID 205 BSSID Color Bits," IEEE 802.11-13/12071 (Sep. 16, 2013).

\* cited by examiner

L-STF | L-LTF | L-SIG/R-L-SIG | HE-SIG-A1 | HE-SIG-A2 | HE-STF | HE-LTF | HE-SIG-C

FIG. 11

| Element ID | Length | MaxBSSID Indicator | Optional Sub-elements |
|---|---|---|---|
| 1 | 1 | 1 | variable |

Octets

FIG. 14

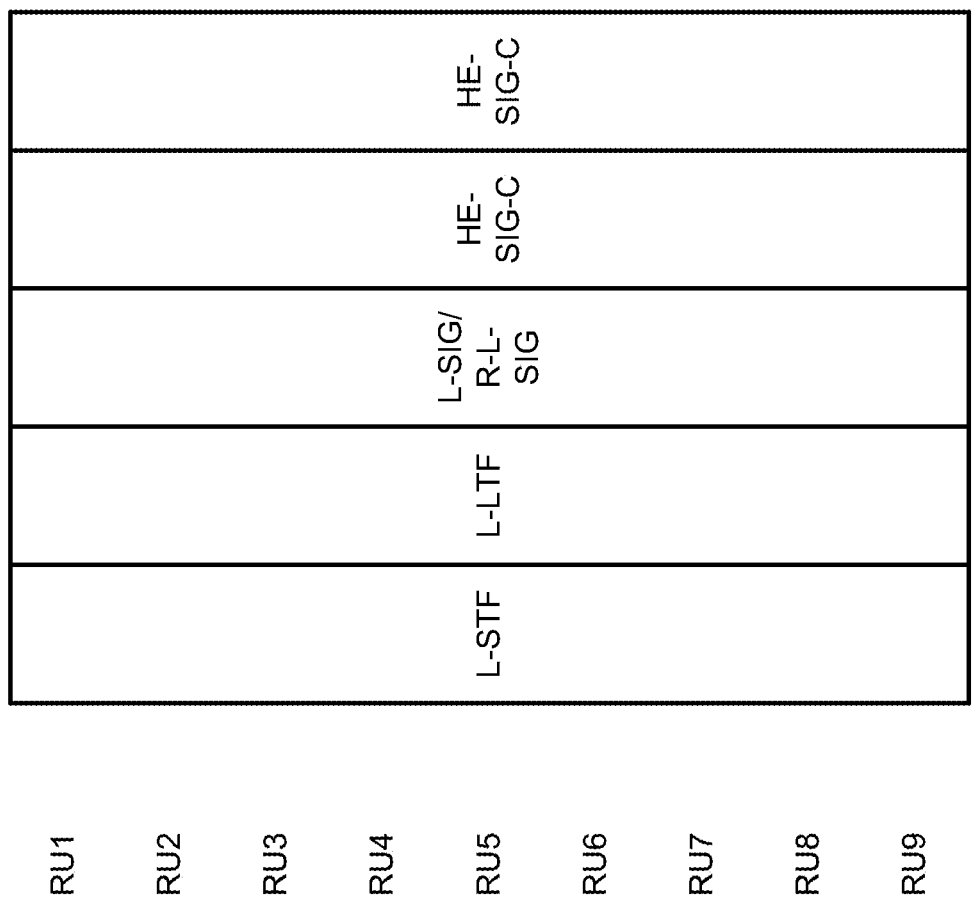

CONTROL AND OPERATION IN WIRELESS LOCAL AREA NETWORK

CROSS-REFERENCE TO RELATED APPLICATIONS

This application is a continuation of U.S. application Ser. No. 16/069,908 filed on Jul. 13, 2018, which claims the benefit of PCT/US2017/013326 filed on Jan. 13, 2017, which claims the benefit of provisional U.S. patent application No. 62/278,558, filed Jan. 14, 2016, the disclosure of which is incorporated herein by reference in its entirety.

BACKGROUND

A Wireless Local Area Network (WLAN) may have multiple modes of operation, such as an Infrastructure Basic Service Set (BSS) mode and an Independent BSS (IBSS) mode. A WLAN in Infrastructure BSS mode may include an Access Point (AP) for the BSS. One or more wireless transmit receive units (WTRUs), e.g., stations (STAs), may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs.

SUMMARY

Systems, methods, and instrumentalities related to control and operation in WLANs are disclosed. A range extension notification/enablement scheme, a clear channel assessment (CCA), a headroom indication, and/or power scaling may be provided for a range extension mode. BSS color may be provided for multiple-BSSs under an AP. Uplink (UL) transmission may be provided with different fragmentation capabilities. A high-efficiency (HE) trigger-based UL null data packet (NDP) physical layer convergence protocol (PLCP) protocol data unit (PPDU) frame may be provided.

An AP may send a frame associated with range extension discovery to a plurality of WLAN stations. The frame may be sent via orthogonal frequency division multiple access (OFDMA) and may include information on how the WLAN stations should respond to the frame (e.g., the frame may include an instruction for each of the plurality of WLAN stations to indicate its transmit power in a response, the frame may specify what resources each of the plurality of WLAN stations should use for sending a response, and/or the like). The AP may receive a response from at least one of the plurality of WLAN stations. The response may include an indication of a transmit power of the at least one of the plurality of WLAN stations. The response may be sent by the at least one of the plurality of WLAN stations via one of the following: OFDMA on a scheduled resource unit, OFDMA on a resource unit obtained through frequency-domain random access, or uplink multi-user multiple-input multiple-output (UL-MU-MIMO). The AP may determine whether the at least one of the plurality of WLAN stations should transmit using a range extension mode based on the transmit power indicated in the response. Based on a determination that the at least one of the plurality of WLAN stations should transmit using the range extension mode, the AP may send an indication to the at least one of the plurality of WLAN stations to switch to the range extension mode.

The frame associated with range extension discovery may include a legacy short training field (L-STF), a legacy long training field (L-LTF), a first high efficiency SIG-A (HE-SIG-A) field, and a second HE-SIG-A field. The L-STF and the L-LTF may be boosted by 3 dB, and the first and second HE-SIG-A fields may be repeated at least once in the frame. The frame associated with range extension discovery may include one or more of the following: an indication of a transmit power of the AP, a group identifier associated with one or more of the plurality of WLAN stations, and an indication of a transmit power with which the plurality of WLAN stations are expected to send their respective responses. The indication of the transmit power of the at least one of the plurality of WLAN stations may be included in a preamble of the response received from the at least one of the plurality of WLAN stations. The response from the at least one of the plurality of WLAN stations may include an indication that the at least one of the plurality of WLAN stations desires to use the range extension mode. Such an indication may be included in an n-tone SIG field that may be part of the response from the at least one of the plurality of WLAN stations. The response from the at least one of the plurality of WLAN stations may include a MU-OFDMA control frame that in turn may include an L-STF, an L-LTF, a first HE-SIG-A field, and a HE-SIG-A field. The L-STF and the L-LTF in the response may be boosted by 3 dB, and the first and second HE-SIG-A fields may be repeated at least once in the MU-OFDMA control frame.

BRIEF DESCRIPTION OF THE DRAWINGS

FIG. 10 depicts an example MU orthogonal frequency-division multiple access (OFDMA) null data packet (NDP) for a RE response.

FIG. 11 depicts an example uplink MU OFDMA NDP for RE response using the RE format.

FIG. 14 depicts an example multiple-BSSID element format.

FIG. 16 depicts an example uplink MU-OFDMA NDP frame.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
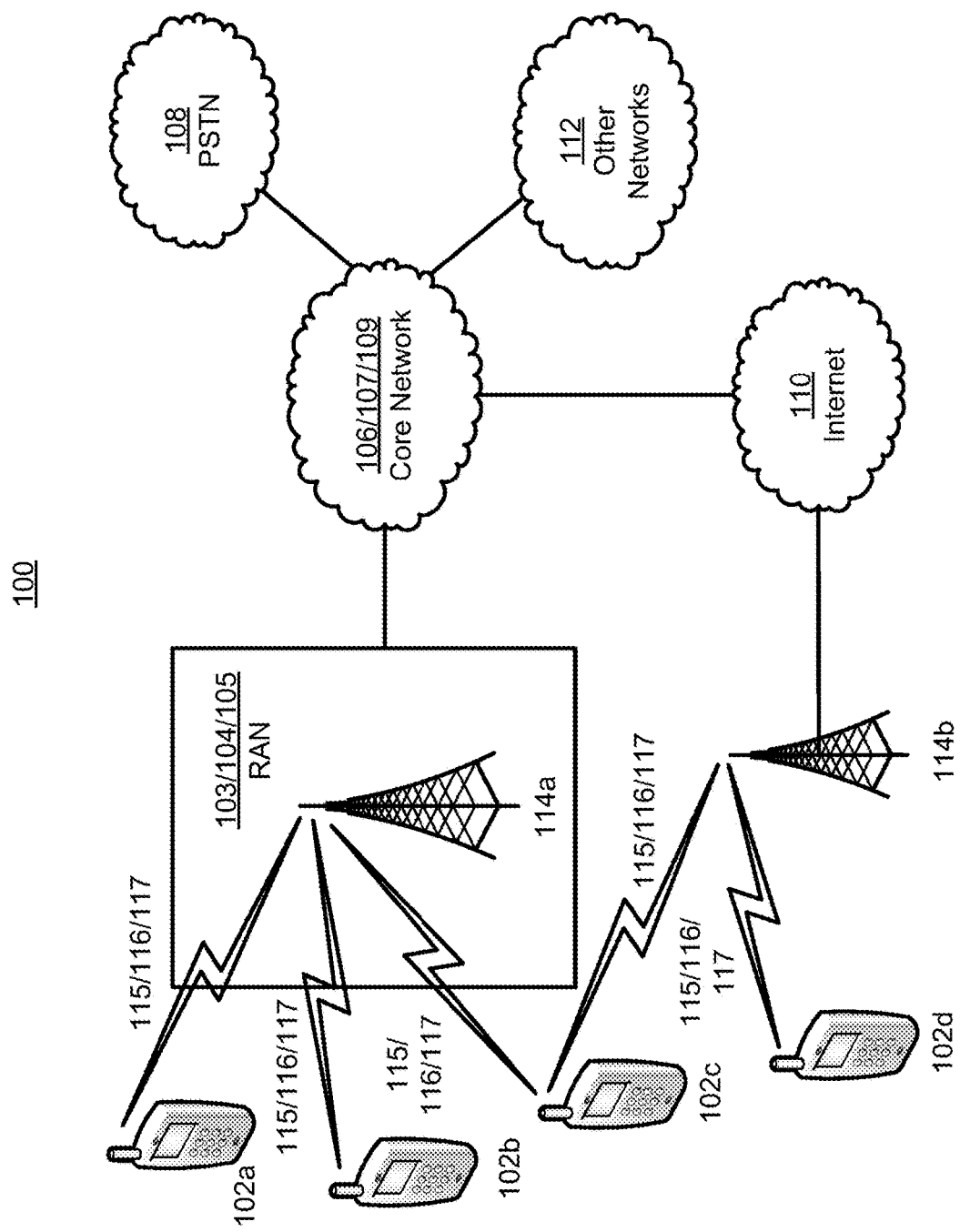
FIG. 1A is a diagram of an example communications system in which one or more disclosed features may be implemented.

FIG. 1A is a diagram of an example communications system 100 in which one or more disclosed features may be implemented. For example, a wireless network (e.g., a wireless network comprising one or more components of the communications system 100) may be configured such that bearers that extend beyond the wireless network may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
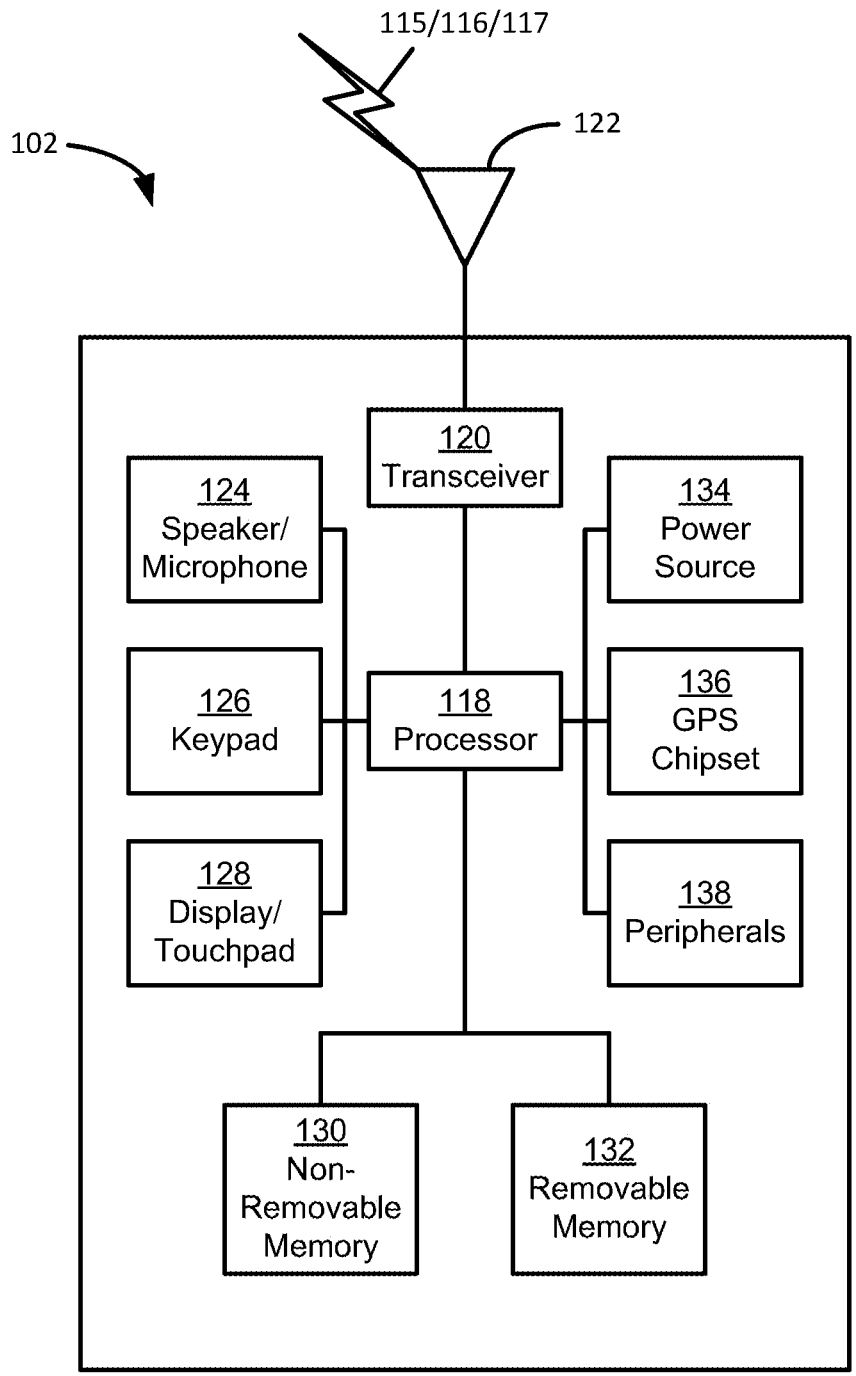
FIG. 1B depicts an exemplary wireless transmit/receive unit, WTRU.

FIG. 1B depicts an exemplary wireless transmit/receive unit, WTRU 102. WTRU 102 may be used in one or more of the communications systems described herein. As shown in FIG. 1n, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
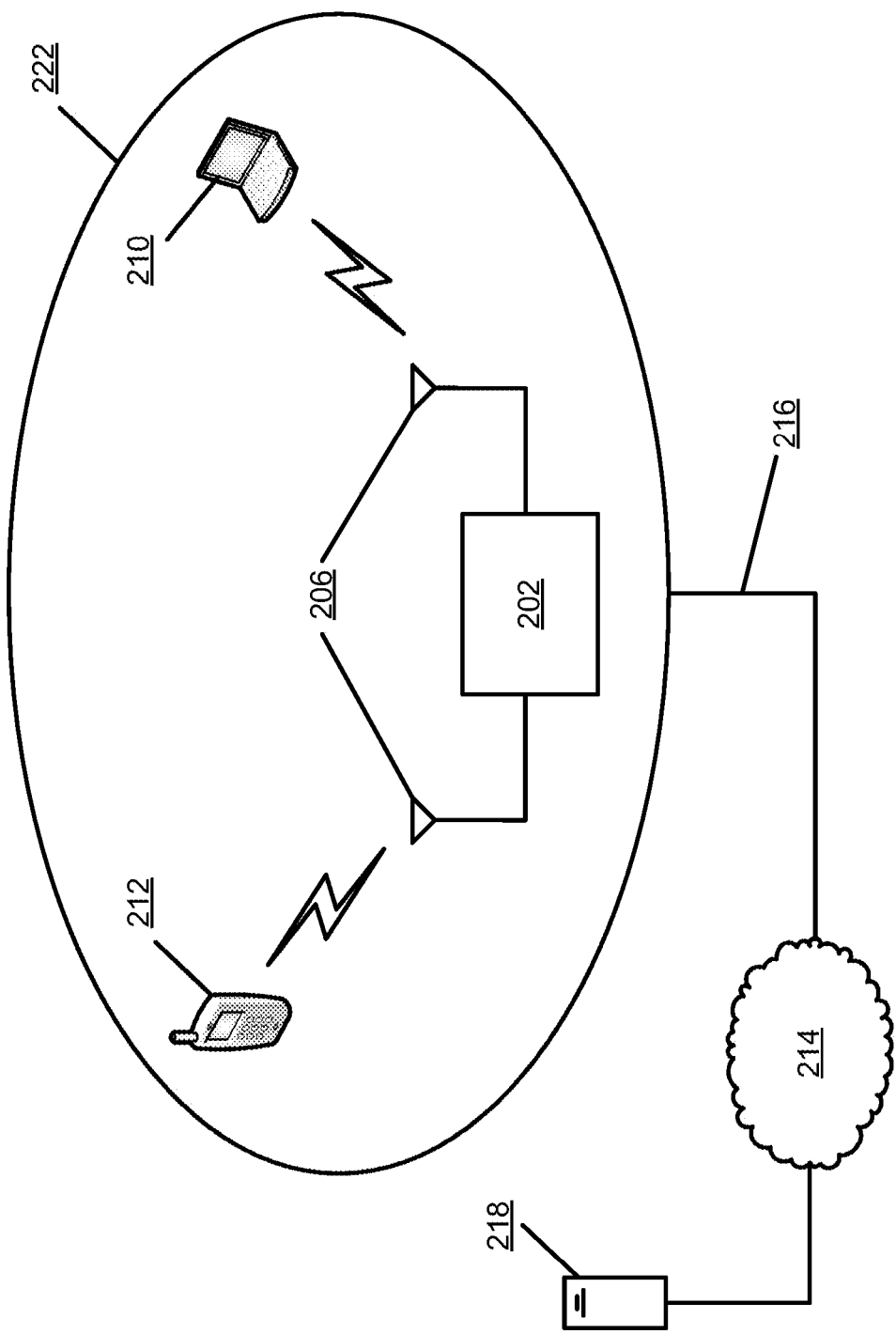
FIG. 1C illustrates exemplary wireless local area network (WLAN) devices.

FIG. 1C illustrates exemplary wireless local area network (WLAN) devices. One or more of the devices may be used to implement one or more of the features described herein. The WLAN may include, but is not limited to, access point (AP) 202, station (STA) 210, and STA 212. STA 210 and 212 may be associated with AP 202. The WLAN may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 202, STA 210, and STA 212 may comprise BSS 222. An extended service set (ESS) may comprise one or more APs (with one or more BSSs) and STA(s) associated with the APs. An AP may have access to, and/or interface to, distribution system (DS) 216, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 218, may be sent to an AP in the WLAN, which may send the traffic to the destination, e.g., via DS 216 to network 214 to be sent to server 218. Traffic between STAs within the WLAN may be sent through one or more APs. For example, a source STA (e.g., STA 110) may have traffic intended for a destination STA (e.g., STA 212). STA 210 may send the traffic to AP 202, and, AP 202 may send the traffic to STA 212.

A WLAN may operate in an ad-hoc mode. The ad-hoc mode WLAN may be referred to as independent basic service set (IBBS). In an ad-hoc mode WLAN, the STAs may communicate directly with each other (e.g., STA 210 may communicate with STA 212 without such communication being routed through an AP).

IEEE 802.11 devices (e.g., IEEE 802.11 APs in a BSS) may use beacon frames to announce the existence of a WLAN network. An AP, such as AP 202, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver and/or transmitter (e.g., which may be combined in a transceiver), one or more antennas (e.g., antennas 206 in FIG. 1C), etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 1C. The processor may be configured to execute processor executable code (e.g., instructions) including, for example, software and/or firmware instructions. For example, the processer may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processor. The processor may communicate with one or more entities of memory, e.g., via a system bus, directly, etc.

A WLAN may have multiple modes of operation, such as an Infrastructure Basic Service Set (BSS) mode and an Independent BSS (IBSS) mode. A WLAN in Infrastructure BSS mode may have an AP for the BSS. One or more STAs (e.g., WTRUs) may be associated with the AP. The AP may have access or an interface to a Distribution System (DS) or other types of wired/wireless networks that carry traffic in and out of the BSS. Traffic to the STAs that originates from outside the BSS may arrive through the AP, which may deliver the traffic to the STAs. Traffic originating from the STAs to destinations outside the BSS may be sent to the AP, which may deliver the traffic to respective destinations. Traffic between the STAs within the BSS may be sent through the AP, e.g., from a source STA to the AP and from the AP to the destination STA. Traffic between the STAs within the BSS may be peer-to-peer traffic. Peer-to-peer traffic may be sent directly between the source and destination STAs, for example, with a direct link setup (DLS) using an 802.11e DLS or an 802.11z tunneled DLS (TDLS). A WLAN in Independent BSS (IBSS) mode may not have an AP, and, STAs may communicate directly with each other. An IBSS mode of communication may be referred to as an "ad-hoc" mode of communication.

An AP may transmit a beacon on a fixed channel (e.g., a primary channel), for example, in an 802.11ac infrastructure mode of operation. A channel may be, for example, 20 MHz wide. A channel may be an operating channel of a BSS. A channel may be used by STAs, for example, to establish a connection with an AP. An example channel access mechanism in an 802.11 system may be Carrier Sense Multiple Access with Collision Avoidance (CSMA/CA). An STA, including an AP, may sense a primary channel, for example, in a CSMA/CA mode of operation. An STA may back off from a channel, for example, when the channel is detected to be busy to enable one STA to transmit at a time in a given BSS.

High Throughput (HT) STAs may use, for example, a 40 MHz wide channel for communication (e.g., in 802.11n). A primary 20 MHz channel may be combined with an adjacent 20 MHz channel to form a 40 MHz wide contiguous channel.

Very High Throughput (VHT) STAs may support, for example, 20 MHz, 40 MHz, 80 MHz and 160 MHz wide channels (e.g., in 802.11ac). 40 MHz and 80 MHz channels may be formed, for example, by combining contiguous 20 MHz channels. A 160 MHz channel may be formed, for example, by combining eight contiguous 20 MHz channels or by combining two non-contiguous 80 MHz channels, which may be referred to as an 80+80 configuration. An 80+80 configuration may be passed through a segment parser that divides data into two streams, for example, after channel encoding. Inverse Fast Fourier Transform (IFFT) and time domain processing may be performed, for example, on each stream separately. Streams may be mapped onto two channels. Data may be transmitted on the two channels. A receiver may reverse a transmitter mechanism. A receiver may recombine data transmitted on multiple channels. Recombined data may be sent to Media Access Control (MAC).

Sub-GHz (e.g. MHz) modes of operation may be supported, for example, by 802.11af and 802.11ah. Channel operating bandwidths and carriers may be reduced, for example, relative to the bandwidths and carriers used in 802.11n and 802.11ac. 802.11af may support, for example, 5 MHz, 10 MHz and 20 MHz bandwidths in a TV White Space (TVWS) spectrum. 802.11ah may support, for example, 1 MHz, 2 MHz, 4 MHz, 8 MHz and 16 MHz bandwidths in non-TVWS spectrum. An example of a use case for 802.11ah may be support for Meter Type Control (MTC) devices in a macro coverage area. MTC devices may have limited capabilities (e.g. limited bandwidths) and may be designed to have a long battery life.

WLAN systems (e.g. 802.11n, 802.11ac, 802.11af and 802.11ah systems) may support multiple channels and channel widths, such as a channel designated as a primary channel. A primary channel may, for example, have a bandwidth equal to the largest common operating bandwidth supported by STAs in a BSS. Bandwidth of a primary channel may be limited by an STA that supports the smallest bandwidth operating mode. In an example of 802.11ah, a primary channel may be 1 MHz wide, for example, when one or more STAs (e.g., MTC type devices) support a 1 MHz mode while an AP and other STAs support a 2 MHz, 4 MHz, 8 MHz, 16 MHz or other channel bandwidth operating modes. Carrier sensing and NAV settings may depend on the status of a primary channel. As an example, all available frequency bands may be considered busy despite some of the bands being idle and/or available, when a primary channel has a busy status (e.g., because an STA that supports only a 1 MHz operating mode is transmitting to an AP on the primary channel).

Available frequency bands may vary between different regions. For example, available frequency bands used by 802.11ah may be 902 MHz to 928 MHz in the United States, 917.5 MHz to 923.5 MHz in Korea, and 916.5 MHz to 927.5 MHz in Japan. Total bandwidth available may vary between different regions. As an example, the total bandwidth available for 802.11ah may be 6 MHz to 26 MHz depending on the country code.

IEEE 802.11™ High Efficiency WLAN (HEW) may enhance the quality of service (QoS) experienced by wireless users in many usage scenarios, such as high-density deployments of APs and STAs in 2.4 GHz and 5 GHz bands. HEW Radio Resource Management (RRM) technologies may support a variety of applications or usage scenarios, such as data delivery for stadium events, high user density scenarios such as train stations or enterprise/retail environments, video delivery and wireless services for medical applications. HEW may be implemented, for example, in IEEE 802.11ax.

Short packets, which may be generated by network applications, may be applicable in a variety of applications, such as virtual office, TPC acknowledge (ACK), Video streaming ACK, device/controller (e.g. mice, keyboards, game controls), access (e.g. probe request/response), network selection (e.g. probe requests, Access Network Query Protocol (ANQP)) and network management (e.g. control frames).

MU features, such as uplink (UL) and downlink (DL) Orthogonal Frequency-Division Multiple Access (OFDMA) and UL and DL MU-MIMO, may be implemented. OFDMA may exploit channel selectivity, for example, to improve or maximize frequency selective multiplexing gain in dense network conditions. A mechanism may be designed and defined for feedback, for example, to enable fast link adaptation, frequency selective scheduling and resource unit based feedback.

A range extension mode may be implemented. A conventional range extension mode may be a single user (SU) range extension mode. Such a range extension mode may be used for example, for one or more transmissions where a receiver may experience a large path-loss and/or a channel delay spread (e.g., such as in outdoor hotspots).

Figure 2:
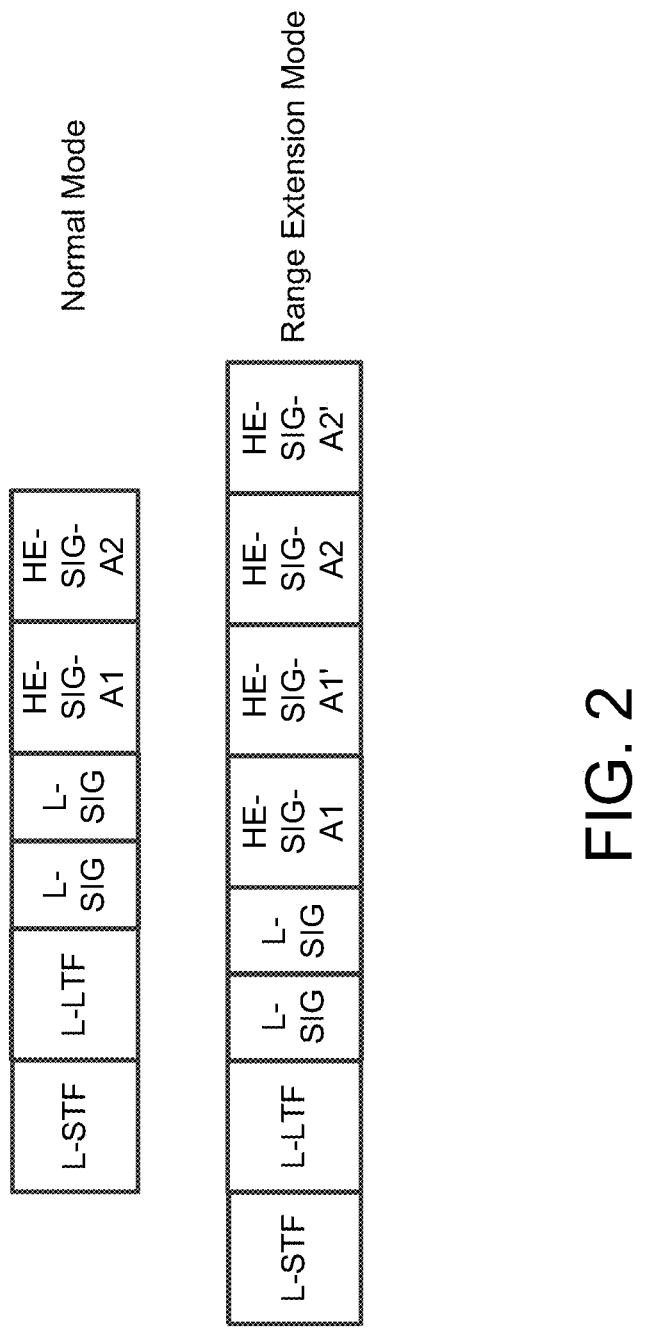
FIG. 2 depicts an example preamble for a range extension (RE) mode and a normal mode.
Figure 3:
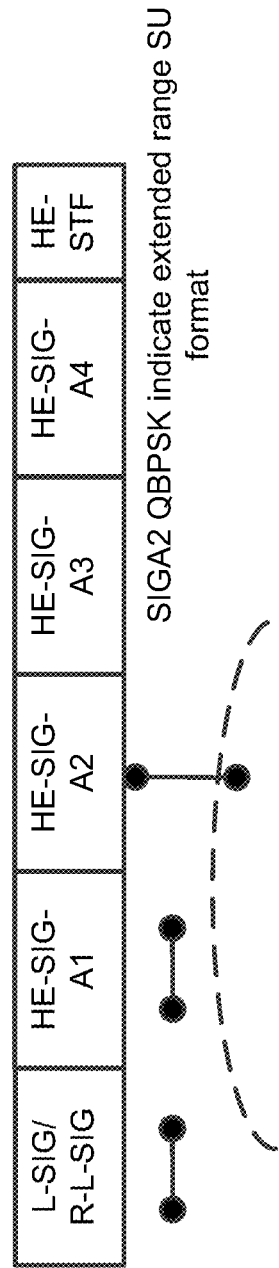
FIG. 3 depicts an example RE mode with modulation.

FIG. 2 depicts example preambles for a range extension mode and a normal mode. The preambles in both modes may include a High-Efficiency SIG-A (HE-SIG-A) field. In the range extension mode, the preamble may be characterized by one or more of the following. The HE-SIG-A field may be time-repeated (e.g., shown as HE-SIG-A1' and HE-SIG-A2'). A bit interleaver may be bypassed in one or more repeated HE-SIG-A symbols. Enablement of the range extension mode may be indicated (e.g., in the preamble or by the format of the preamble). For example, the range extension mode may be indicated before the HE-SIG-A field. The range extension mode may be indicated by setting the length of a legacy signal (L-SIG) field to a specific value (e.g., L-SIG length mod 2=2), and/or by transmitting the HE-SIG-A1' field using QBPSK symbols (e.g., as shown in FIG. 3). A non-high throughput (HT) legacy short training field (L-STF) and/or a non-HT legacy long training field (L-LTF) field may be power-boosted (e.g., by 3 dB).

FIG. 3 depicts an example range extension mode with modulation in which a single user range extension mode may be indicated by transmitting a HE-SIG-A2' field using QBPSK.

An AP may determine to use the range extension mode. The AP may use a network deployment and/or a channel measurement to determine whether to use the range extension mode. An AP may support two or more BSSs. For example, multiple BSS Identifier (BSSID) capability may enable support of two or more BSSs (e.g., virtual BSSs) by an AP. Information for multiple BSSIDs may be advertised. The information for multiple BSSIDs may be advertised using a beacon frame and/or a probe response frame (e.g., a single beacon frame and/or a single probe response frame).

Figure 4:
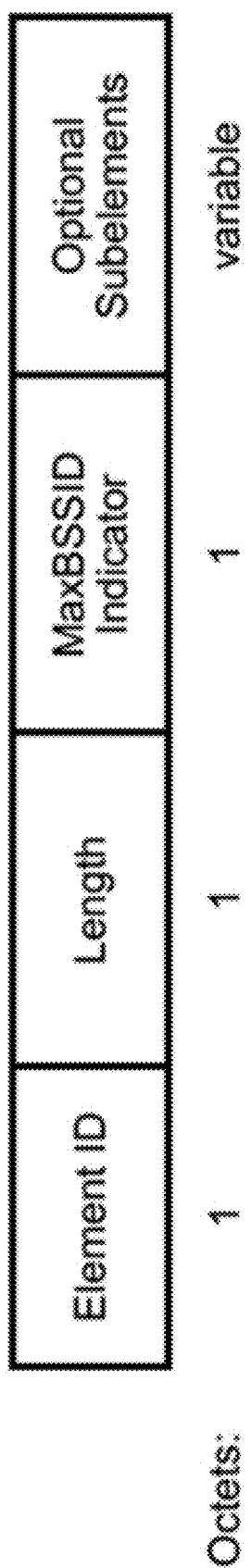
FIG. 4 depicts an example beacon frame for multiple basic service set identifications (BSSIDs).

FIG. 4 depicts an example beacon frame for multiple BSSIDs. A field (e.g., MaxBSSID Indicator) may be designated in a beacon frame to indicate whether multiple BSSIDs (e.g., multiple virtual BSSIDs within a physical BSS) are configured and/or the number of BSSIDs configured. Two or more virtual BSSs may be attached to the same or different radios in an AP. The AP may trigger one or more STAs associated with a virtual BSS for an UL multi-user (MU) transmission and/or random access. The AP may trigger one or more STAs associated with two or more virtual BSSs for UL MU transmission and/or random access.

BSS color and/or spatial reuse may be provided in a dense network. A STA may detect a frame and determine whether the detected frame is an inter/overlapping-BSS or an intra-BSS frame. The STA may use a BSS color and/or a MAC address in the MAC header to determine whether the detected frame is an inter/overlapping-BSS or an intra-BSS frame. One or more preamble detect (PD) energy levels may be set to different values (e.g., to improve spatial reuse). The one or more PD energy levels may be set based on whether the detected frame is an intra-BSS (BSS PD) or an overlapping-BSS frame (OBSS PD). A high efficiency (HE) STA may identify and/or remember one or more NAVs set by an intra-BSS frame and/or an OBSS frame. A contention free (CF)-end frame (e.g., from an intra-BSS) may not reset a NAV set by an OBSS frame. The HE STA may determine which BSS is the origin of a frame. For example, the HE STA may use a BSS color to determine which BSS is the origin of the frame.

A STA (e.g., an HE STA) may identify an intra-BSS transmission. The STA may use a BSS color to identify the intra-BSS transmission. The STA may enter a power save mode (e.g., if a transmission is not meant for the STA). The power save mode may comprise a doze state. An HE non-AP STA may enter the doze state. The HE non-AP STA may remain in the doze state until the end of an HE DL MU PPDU. The HE non-AP STA may enter and/or remain in the doze state until the end of the HE DL MU PPDU if the PPDU's BSS Color field is equal to the BSS color of its BSS and/or if a value derived from a STA's identifier in the HE-SIG-B field does not match the HE non-AP STA's identifier or a broadcast/multicast identifier. The HE non-AP STA may enter the doze state and/or remain in the doze state until the end of an HE UL MU PPDU if the PPDU's BSS Color field is equal to the BSS color of the HE non-AP STA BSS. The HE STA may enter the doze state and/or remain in the doze state until the end of an HE SU PPDU if the PPDU's BSS color field is equal to the BSS color of the HE STA BSS and/or if the UL/DL Flag field indicates that the frame is an UL frame.

Fragmentation of multi-user frames may be provided. Fragmentation may enable efficient use of resources in multi-user transmissions. Fragmentation may enable one or more STAs to transmit in the allocated resources with a granularity less than a complete MSDU.

Figure 5:
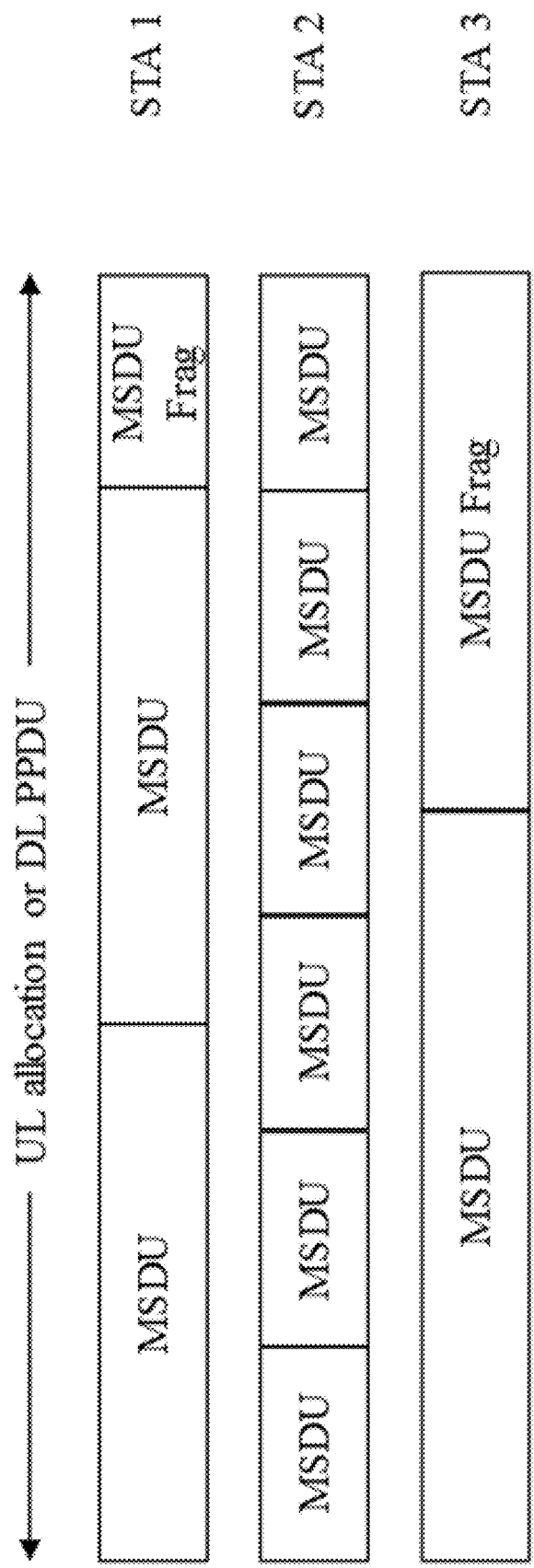
FIG. 5 depicts an example fragmentation of multi-user (MU) frames.

FIG. 5 depicts an example fragmentation of multi-user frames. One or more (e.g., 4) levels of fragmentation capability may be used, e.g., negotiated between the AP and one or more STAs. The one or more levels of fragmentation may comprise Level 0, Level 1, Level 2, and/or Level 3. Level 0 may comprise no support for fragmentation. Level 1 may comprise support for a fragment in a Very High Throughput (VHT) MAC Protocol Data Unit (MPDU) (e.g., a single MPDU). Level 2 may comprise support for one fragment per MSDU in an Aggregated MPDU (A-MPDU). Level 3 may support multiple fragments of an MSDU per A-MPDU.

As described herein, an AP may determine to use the range extension mode based on network configuration and/or a measurement. When L-STF and/or L-LTF boosting is performed in the range extension mode, an energy-based clear channel assessment (CCA) may be incorrect. For example, the energy measured in the L-STF and/or in the L-LTF may not equal the energy used in a transmission.

Figure 6A:
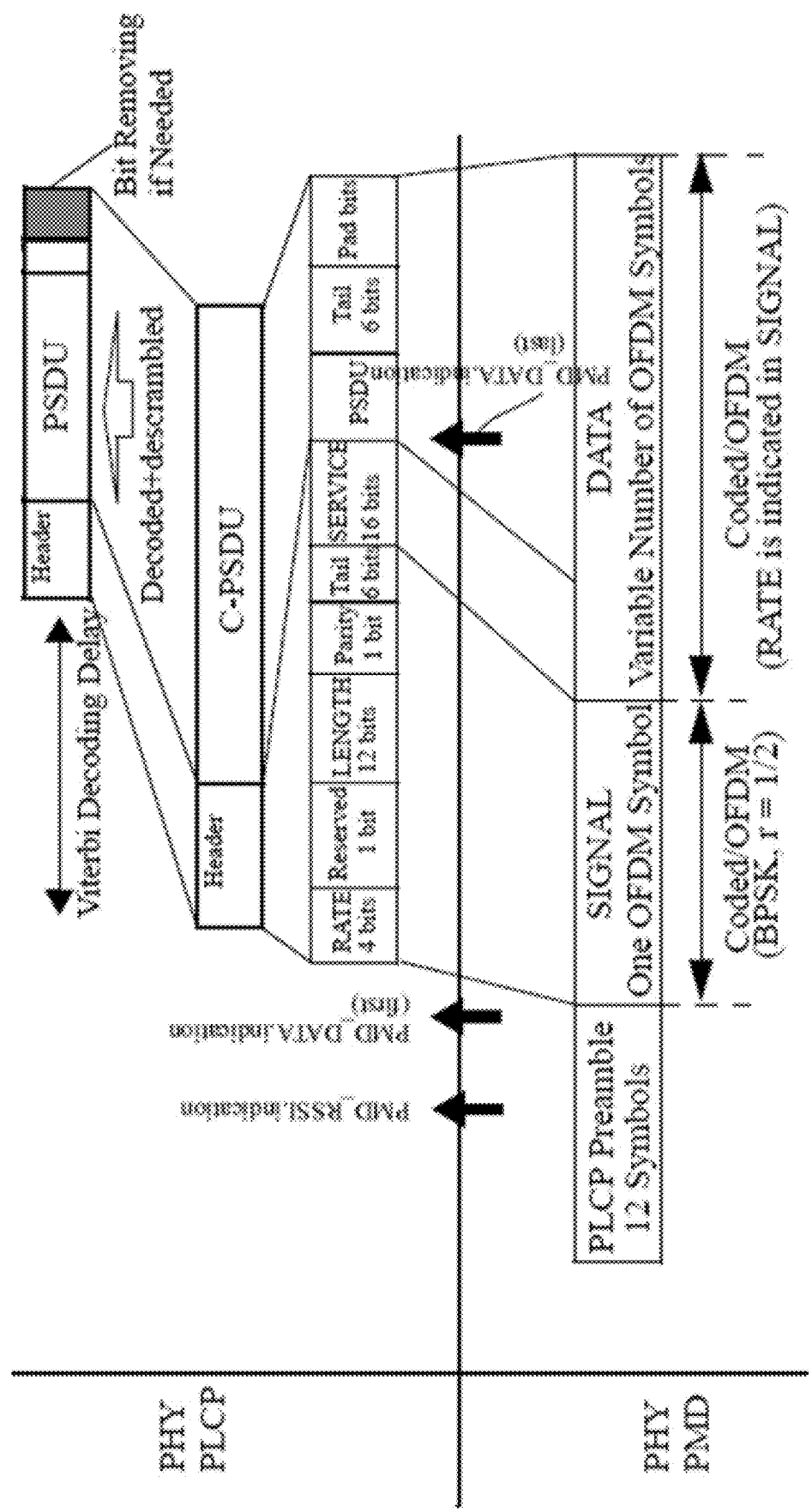
FIGS. 6A and 6B depict an example of transmission reception using a physical layer convergence protocol (PLCP).
Figure 6B:
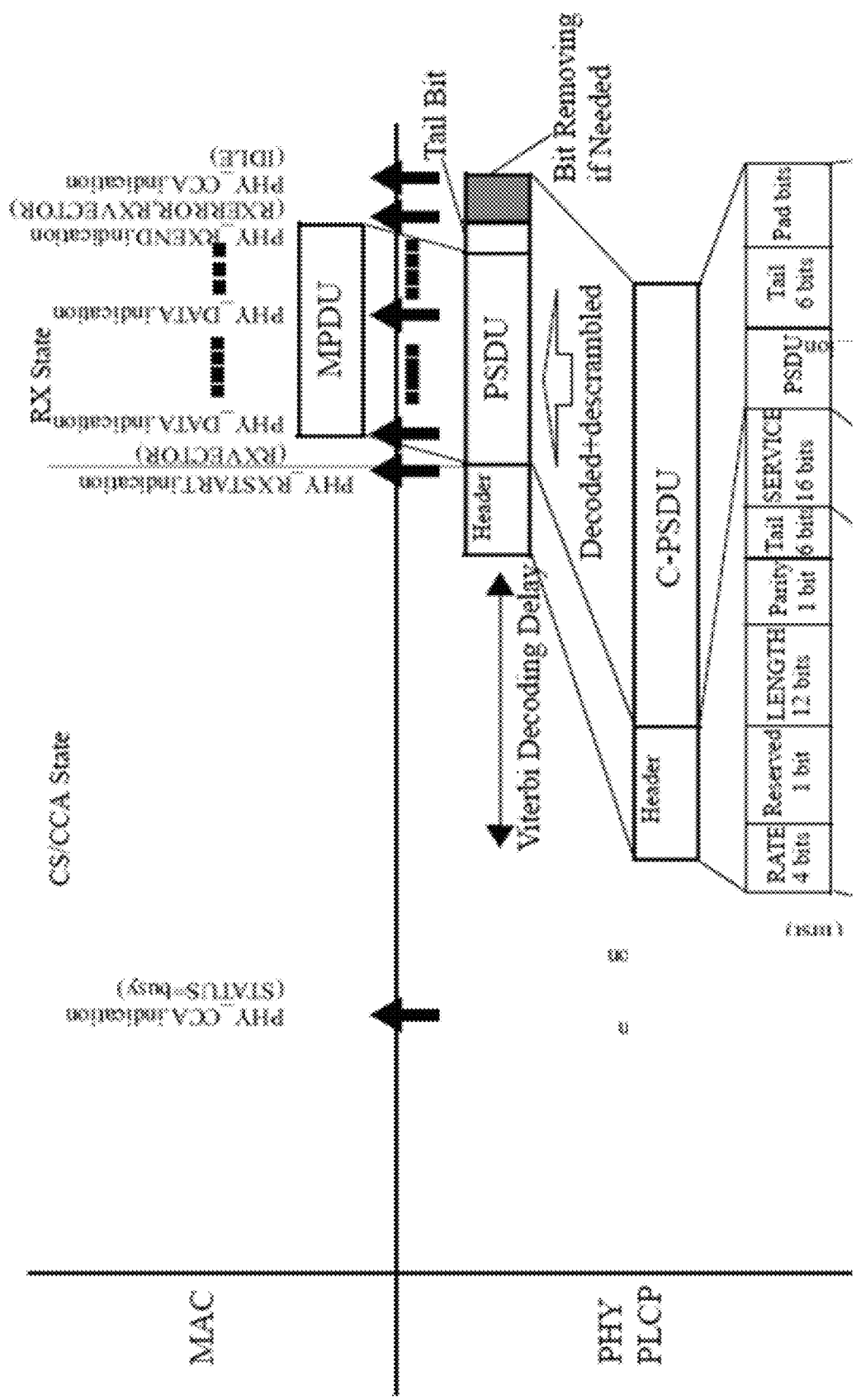
Figure 7A:
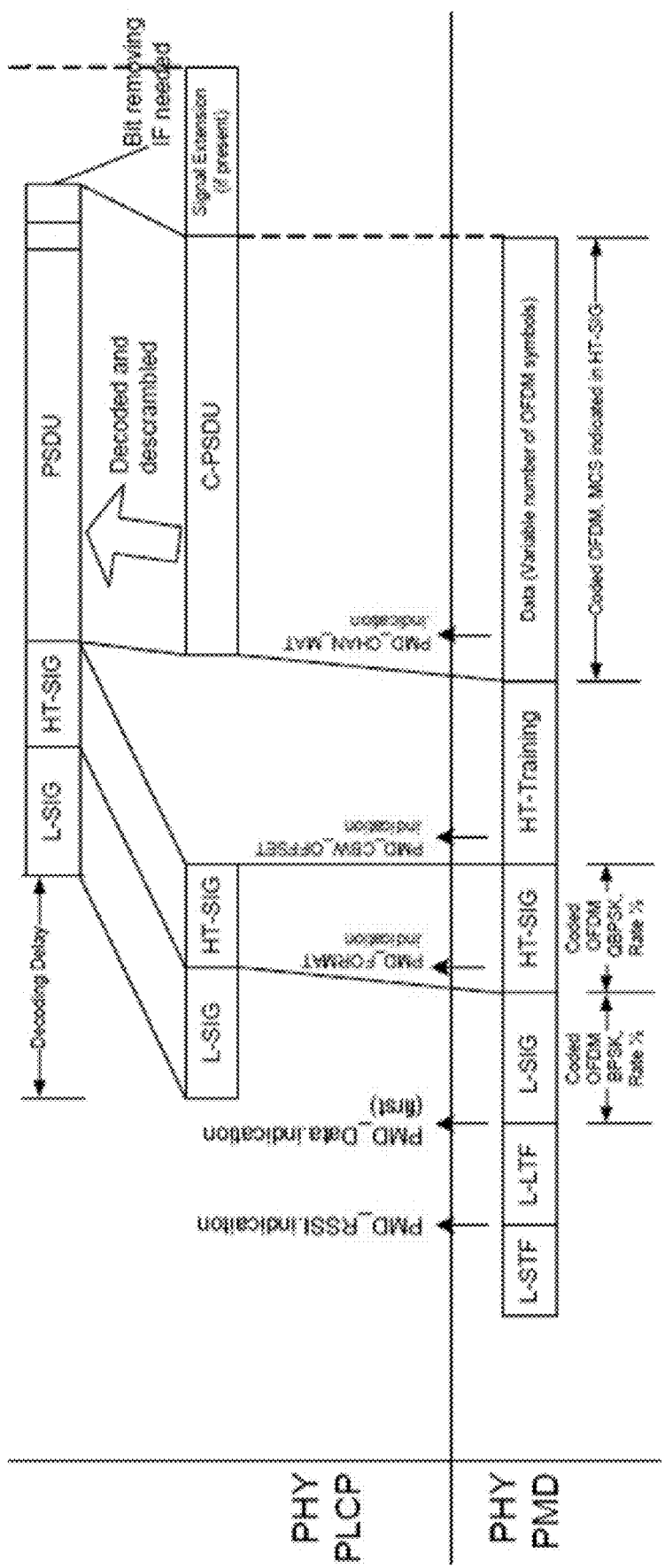
FIGS. 7A and 7B depict an example of transmission reception using the PLCP and a HT-fixed format.
Figure 7B:
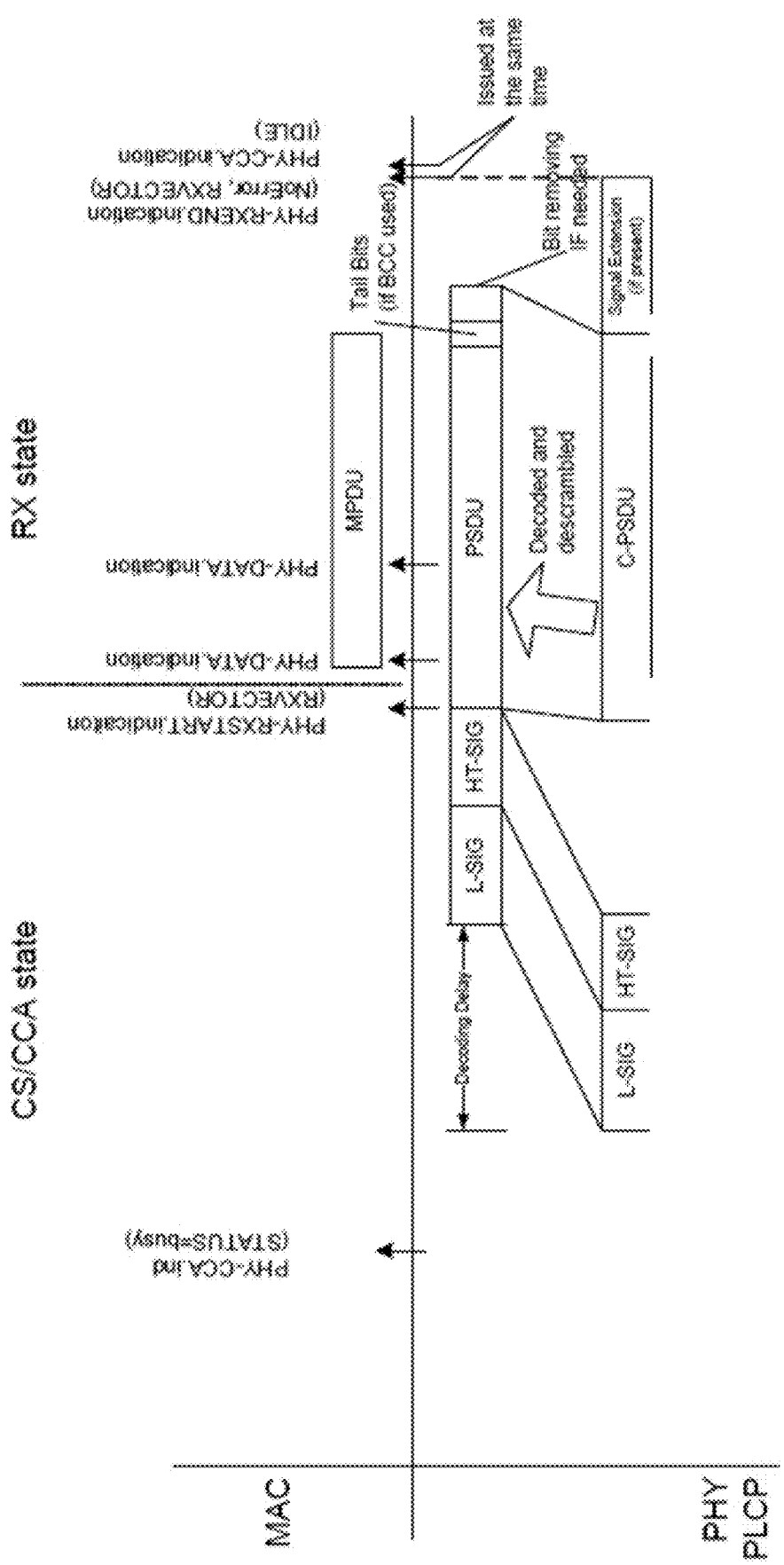

FIGS. 6A and 6B depict an example of transmission reception using a physical layer convergence protocol (PLCP) as provided in the OFDM PHY specification. FIGS. 7A and 7B depict an example of transmission reception using the PLCP and a HT-mixed format. A PMD_RSSI indication may be used to derive a PHY_CCA indication (e.g., for the OFDM PHY specification and/or for the HT mixed format). The PMD_RSSI indication may be measured from a STF (e.g., the Legacy STF), which may not equal the energy used in transmission. To enhance the accuracy of energy estimation, the actual receive energy in the channel may be estimated. The actual receive energy in the channel may be determined so as not to over-estimate the energy in the channel during CCA.

In certain situations (e.g., when a STA may be close to and/or exceed its maximum transmit power, and may not have enough headroom to boost the LTF by 3 dB), range extension may be enabled. Range extension may focus on not only single-user transmissions, but also multi-user transmissions. Range extension may be enabled for one or more STAs or for an entire BSS.

A physical AP may support two or more (e.g., multiple) BSSs. The BSSs may comprise a virtual BSS. One or more BSS colors may be provided for the BSSs. Each of the BSSs may be allocated a BSS color. Setting a spatial reuse (e.g., a NAV setting and/or one or more CF-END resets) and/or a power save behavior based on the BSS color may be unreliable (e.g., if each BSS of the multiple BSSs is allocated a different BSS color). A BSS color may be determined for the multiple BSSs and/or STAs (e.g., to enable proper spatial reuse and/or power savings).

An AP may transmit to two or more STAs with different negotiated fragmentation levels. The two or more STAs may comprise different STA fragmentation capabilities. Each of the two or more STAs may decode allocated resources independently based on the fragmentation capabilities. The AP may receive data from the two or more STAs, and may negotiate one or more fragmentation levels for the two or more STAs.

One or more control frames may be exchanged between an AP and its associated STAs (e.g., in a multi-user (MU) transmission). A MU UL PPDU may comprise UL control information (e.g., in one or more control frames). The MU UL PPDU may comprise multiple MAC frames from multiple users. A MAC control frame (e.g., a full MAC control frame) may comprise a MAC header and a MAC body. Using a full MAC control frame to send limited control information may not be efficient.

A range extension mode may be enabled for an AP and/or a STA. The range extension mode may be STA-specific. For example, the range extension mode may apply to a particular STA, or a group of STAs (e.g., two or more STAs, e.g., belonging to a same group). The range extension mode may be BSS-wide. For example, the range extension mode may apply to specific STA(s) (e.g., all STAs) in a BSS. In BSS-wide range extension, an AP may demand that the STAs (e.g., all STAs) in the BSS transmit using the range extension mode. In STA-specific range extension, the AP may communicate with (e.g., transmit to and/or receive from) from first STA or a first group of one or more STAs using the range extension mode, and communicate with (e.g., transmit to and/or receive from) a second STA or a second group of one or more STAs using the normal mode.

An AP may signal a range extension mode in a beacon frame (e.g., to indicate and/or enable BSS-wide range extension). The signaling may be received by one or more STAs (e.g., all STAs in a BSS). The signaling may comprise a range extension mandatory bit, which may indicate to the receiving STAs to transmit using the range extension mode. The signaling may comprise a group id field to indicate to the STAs associated with the group id to enter the range extension mode. The signaling may include individual STA identifiers to indicate to the STAs that are associated with the identifiers to enter the range extension mode. The AP may determine and use a specific beacon frame format for signaling the range extension mode. The detection of the range extension frame format may trigger the receiving STAs to enable and/or use the range extension mode (e.g., the STAs may transmit using the range extension mode).

Figure 8:
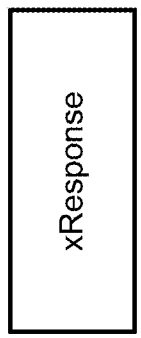
FIG. 8 depicts an example of enabling RE using non-beacon frames.
Figure 8:

FIG. 8 depicts an example of indicating, enabling, and/or using range extension via non-beacon frames. The technique may be used, for example, to enable STA-specific range extension or BSS-wide range extension. A STA may send a request frame (e.g., xRequest in FIG. 8) to an associated AP. The request frame may be a MAC frame. The request frame may comprise a probe request, an association request, and/or a range extension request. The STA may indicate its transmit power (e.g., Tx power in FIG. 8) in the request frame (e.g., so that the AP can compare the transmit power with a measured power of the transmission channel to determine a path loss). The transmit power used by the STA may be indicated in a preamble (e.g., as part of a HE-SIG-A field). The transmit power used by the STA may be indicated as part of a HE-SIG-B field. The AP may measure the received power of the request frame, compare the indicated transmit power with the received power, and determine whether range extension should be enabled for the STA (e.g., based on the difference between the transmit power and the received power, which may provide an indication of path loss).

The AP may send a response frame (e.g., xResponse in FIG. 8) to the STA. The response frame may comprise a probe response, an association response, and/or a range extension response frame. The response frame may comprise signaling (e.g., an instruction) for the STA to enable the range extension mode. The signaling may comprise a range extension enable bit. The signaling may instruct the STA to transmit using the range extension mode. The AP may send the response frame using the range extension mode. The use of the range extension mode may implicitly indicate to the STA that transmissions by the STA should use the range extension mode.

The AP may send an unsolicited frame to the STA (e.g., without first receiving a range extension request). The frame may indicate that the STA should switch to transmitting in the range extension mode. The indication may be explicit. For example, the indication may be implemented via a range extension enable bit comprised in the unsolicited frame. The indication may be implicit. For example, the indication may be provided by sending the unsolicited frame using the range extension mode.

The example techniques described herein may also be used to enable BSS-wide range extension or to enable range extension for specific STA(s) (e.g., a group of one or more STAs). For example, the STAs (e.g., all STAs) in a BSS may each send a range extension request to an associated AP, and receive signaling from the AP allowing or instructing the STAs to switch to the range extension mode. The signaling may be explicit, e.g., by including a range extension enable bit in a response frame, or implicit, e.g., by sending a response frame using the range extension mode. The AP may send an unsolicited (e.g., without receiving a request frame) instruction (e.g., via a frame) to the STAs (e.g., all STAs) in a BSS to switch those STAs to the range extension mode. An unsolicited instruction may include a range extension enable bit, or be sent using the range extension mode to implicitly direct the receiving STAs to transmit using the range extension mode. The unsolicited instruction may be sent in a beacon frame. The instruction may include a group id field (e.g., to indicate to the STAs associated with the group id that they should enter the range extension mode) and/or individual STA identifiers (e.g., to indicate to the STAs associated with individual identifiers that they should enter the range extension mode). In such cases, the beacon frame may be received by multiple STAs, but the STAs switching to the range extension mode may be limited to those STAs with a matching group id.

An AP may determine which STAs should switch to the range extension mode. The AP may conduct range extension discovery. In the range extension discovery, the AP may determine which STAs need range extension. One or more STAs may determine to drop range extension. The one or more STAs may indicate to the AP that the one or more STAs may drop range extension.

Figure 9:
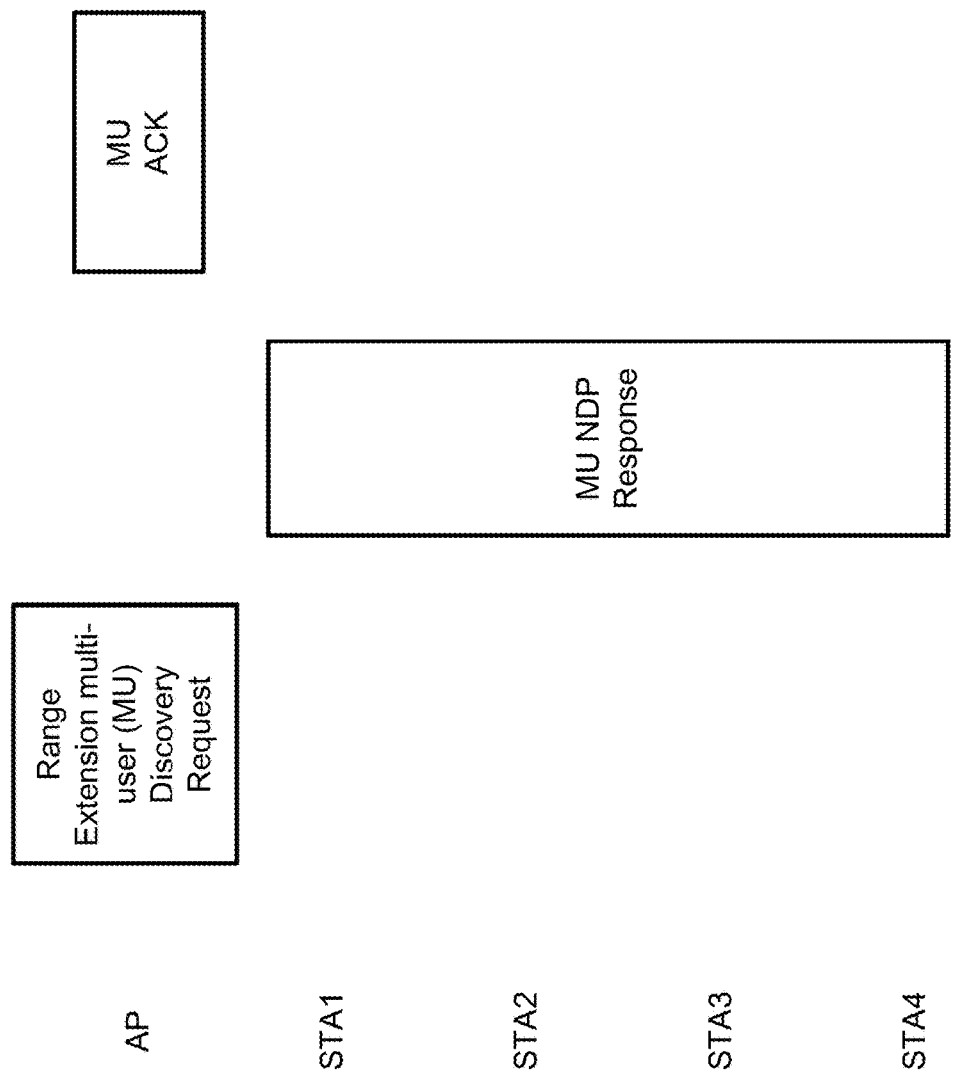
FIG. 9 depicts an example frame exchange for MU RE discovery.

FIG. 9 depicts an example frame exchange for MU range extension discovery. The AP may send a range extension (RE) discovery frame (e.g., such as a multi-user discovery request shown in FIG. 9). The RE discovery frame may initiate the range extension discovery mode. The RE discovery frame may be sent to a specific STA (e.g., the RE discovery frame may request a response frame back from the STA). The RE discovery frame may be sent to a plurality of STAs. The RE discovery frame may comprise a scheduled OFDMA trigger frame (e.g., in which the AP may schedule one or more specific STAs and/or request some or all of the STAs to send an OFMDA/UL-MU-MIMO response back). The RE trigger frame may comprise a normal trigger frame with a flag (e.g., a one-bit field). The flag may indicate to one or more STAs to send a transmit power to the AP. The RE trigger frame may comprise information regarding what resources a STA should use for sending a response. The RE trigger frame may comprise an instruction/indication for multiple STAs that receive the trigger frame to send an OFDMA/UL-MU-MIMO response back. The RE trigger frame may comprise the transmit power of the AP. The one or more STAs may estimate the path loss based on the transmit power of the AP. The one or more STAs may determine (e.g., respectively) whether they should use range extension based on the estimated path loss. The RE trigger frame may be sent using the range extension mode (e.g., to ensure that the STAs are able to receive the RE trigger frame). The RE trigger frame may comprise a 3 dB boost to one or more of the preamble fields (e.g., the L-STF and/or L-LTF). The RE trigger frame may repeat the HE-SIG-A1 and/or HE-SIG-A2.

Each of the one or more STAs (e.g., each scheduled STA) may send information on whether it needs range extension or not. For example, each of the one or more STAs may send a response frame (e.g., such as a MU NDP response frame) to the AP. The response frame may be based on the AP polling a STA (e.g., the response may be sent by a STA in response to the STA receiving the range extension discovery frame from the AP). The response frame may be sent across the entire transmission bandwidth. The response frame may be sent across part of the entire transmission bandwidth. The response frame may be based on the AP initiating a multi-user transmission (e.g., the response may be sent via OFDMA and/or UL-MU-MIMO). The response frame may be sent on a scheduled resource unit (RU) using UL OFDMA. The response frame may be sent on an RU obtained using frequency domain random access (e.g., using UL-OFDMA). The response frame may be sent (e.g., simultaneously) from two or more STAs (e.g., using UL-MU-MIMO).

The response frame may indicate a transmit power of the STA. The AP may determine if range extension is needed based on the transmit power of the STA. The response frame may comprise a flag (e.g., a one-bit field) set by the STA that indicates if range extension is needed. The transmit power and/or the flag may be sent in the response frame preamble (e.g., to reduce the feedback overhead). For example, the transmit power and/or the flag may be sent in a HE-SIG-A field and/or a HE-SIG-B field. Alternatively or additionally, the transmit power and/or the flag may be sent in a MAC frame.

The STA may set a particular power level for sending the response frame (e.g., to ensure that the AP successfully receives the frame). The STA may determine the power level via one or more of the following. The AP discovery request frame may indicate a transmit power of the AP (e.g., so that the STA may determine its own transmit power based on the transmit power of the AP). The AP discovery request frame may indicate a transmit power that should be used by a STA. The AP discovery request frame may indicate a desired receive power at the AP (e.g., to ensure successful reception of the response frame from the STA). The response frame may be transmitted using UL-OFDMA (e.g., the transmission may use a maximum transmit power in a bandwidth RU (e.g., a small bandwidth RU), which may increase transmit power spectral density and/or may ensure proper reception of the response frame).

The AP may acknowledge the receipt of a response frame. The acknowledgment may be sent via a MU ACK, as shown in FIG. 9.

A UL-OFDMA response frame may comprise an UL-OFDMA control frame (e.g., such as an OFDMA null data packet). The UL-OFDMA control frame may include a pre-defined control and/or signal field within a specific RU. The pre-defined control and/or signal field may be referred to herein as an HE-SIG-C field.

FIG. 10 depicts an example uplink MU OFDMA null data packet for a range extension response. The UL-OFDMA control frame may fit within a single n-tone RU (e.g., a n-tone RU may be a RU that includes n subcarriers, e.g., n may have a value of 26, 52, 104, and/or the like). The UL-OFDMA control frame may comprise an HE-STF field. The HE-STF field may comprise an n-tone STF. The HE-STF field may depend on the size and/or position of the RU. The HE-STF field may span the entire transmission bandwidth. The UL-OFDMA control frame may comprise an HE-LTF field. The HE-LTF field may comprise an n-tone LTF. The HE-LTF field may depend on the size and/or position of the RU. The HE-LTF field may span the entire transmission bandwidth. The UL-OFDMA control frame may comprise an HE-SIG-C field. The HE-SIG-C field may comprise an n-tone SIG field. The HE-SIG-C field may comprise (e.g., be filled with or fixed with) different bits representing information to be sent to the AP. For example, a bit of the HE-SIG-C field may be set to indicate a range extension mode on/off. Bit representation of the HE-SIG-C field (e.g., composition of the HE-SIG-C field) may depend on a specific trigger request from the AP (e.g., depend on the information sought in the trigger request). For example, a range extension indication flag and/or other information may be sent back to the AP.

Figure 11:
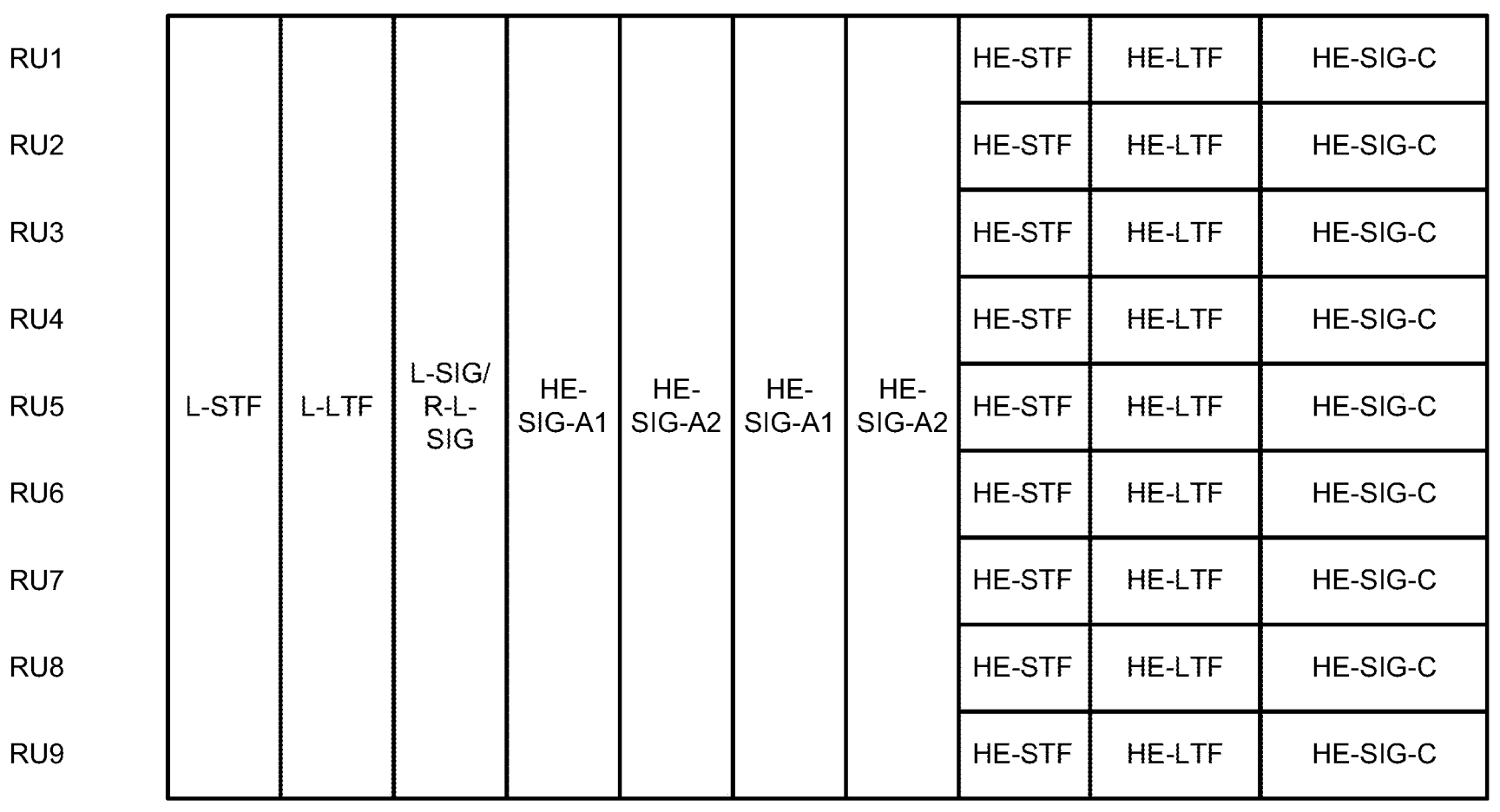

FIG. 11 depicts an example UL MU OFDMA null data packet for a range extension response using an example range extension format. The example format may be employed in a multi-user request and/or response that is set to use the range extension mode. In such scenarios, the L-STF field and/or the L-LTF field may be boosted (e.g., by 3 dB). The SIG-A field (e.g., HE-SIG-A1 and HE-SIG-A2 fields) may be repeated, for example to ensure that the link between AP and STAs may be closed (e.g., to ensure that the power received at the STAs based on a signal transmission for the AP is able to support the transmission of data).

A clear channel assessment (CCA) may be provided in the range extension mode. As described herein, a node (e.g., such as an AP or a STA) may measure the received signal strength information (RSSI) based on the L-STF field in a preamble. The node may set a value for a PMD.RSSI_indication field (e.g., based on the measured RSSI). The PMD.RSSI_indication value may be used by the MAC to set a value for a PHY_CCA.indication field (e.g., by comparing the PMD.RSSI_indication value with the specific energy detection threshold required). If the preamble is decoded, a preamble detection CCA threshold may be used as a comparison. If the preamble is not decoded, an energy detection CCA threshold (e.g., which may be greater than the preamble detection CCA threshold) may be used as a comparison. In range extension scenarios, the PMD.RSSI_indication field may over-estimate the energy in the channel (e.g., because the L-LTF field may have been boosted by 3 dB). The over-estimated channel energy indicated in the PMD.RSSI_indication field may reduce network throughput (e.g., in dense networks).

Figure 12:
FIG. 12 depicts example preamble formats for HE single user (SU) PPDU and HE Extended Range SU PPDU.

FIG. 12 depicts example preamble formats for HE SU PPDU and HE Extended Range SU PPDU. Both preambles may include a L-STF field and/or a L-LTF field. For HE Extended Range SU PPDU, either or both of the L-STF field and the L-LTF field may be boosted (e.g., by 3 dB). The HE-SIG-A1 field and/or the HE-SIG-A2 field may be repeated in the HE Extended Range SU PPDU.

For HE-STAs, the CCA may be modified (e.g., to take into account the increased energy measured in the range extension mode) according to one or more of the following rules. When there is no change in the behavior of the HE-STA, the HE-STA may use, for example, the RSSI estimated from the L-STF field. When a preamble is not detected, the CCA may or may not be modified (e.g., since an energy detection threshold may be large). When a preamble is detected, the CCA may be modified. The HE-STA may modify its behavior to take into account the energy boost of the L-STF and/or L-LTF. The HE-STA may adjust the RSSI.indication (e.g., to account for the boost). The HE-STA may adjust the RSS.indication by a factor (e.g., reduce the PMD.RSSI_indication by 3 dB). The HE-STA may reduce the PMD.RSSI indication by an implementation specific value (e.g., because the changes may not be linear).

The HE-STA may measure the RSSI of the HE-STF. The HE-STA may use the measured RSSI value to set the PHY_CCA.indication. The HE-STA may detect the L-STF. The HE-STA may estimate the RSSI. The HE-STA may include the estimated RSSI in the PMD.RSSI_indication. The HE-STA may detect a repeated L-SIG field. The repeated L-SIG field may indicate that the packet is an HE packet. The HE-STA may detect an HE-SIG-A2 field as a QBPSK, which may indicate an HE extended range SU PPDU. The HE-STA may decode a repeated HE-SIG-A field. The HE-STA may detect an HE-STF. The HE-STA may determine a re-estimated RSSI. The HE-STA may include the re-estimated RSSI in the PMD.RSSI. The HE-STA may estimate the PHY_CCA.indication using the PMD.RSSI.

A headroom indication may be provided for the range extension mode. When a STA transmits near a maximum power, the STA may not have the extra power to boost its L-STF and/or L-LTF (e.g., by 3 dB). The STA may indicate a power headroom to the AP (e.g., during a measurement for RE and/or during association with the AP), in addition to or in lieu of indicating a transmit power. The power headroom indication may comprise the maximum power the STA may transmit. The power headroom indication may comprise a change in power allowed by the STA.

When associating with the AP (e.g., during Range Extension discovery and/or during a range extension request/ response frame exchange), the STA may send transmit power information and/or transmit power headroom (e.g., a transmit power headroom indication) to the AP. If the power headroom is less than 3 dB, the AP may decide not to place the STA in the range extension mode.

Figure 13:
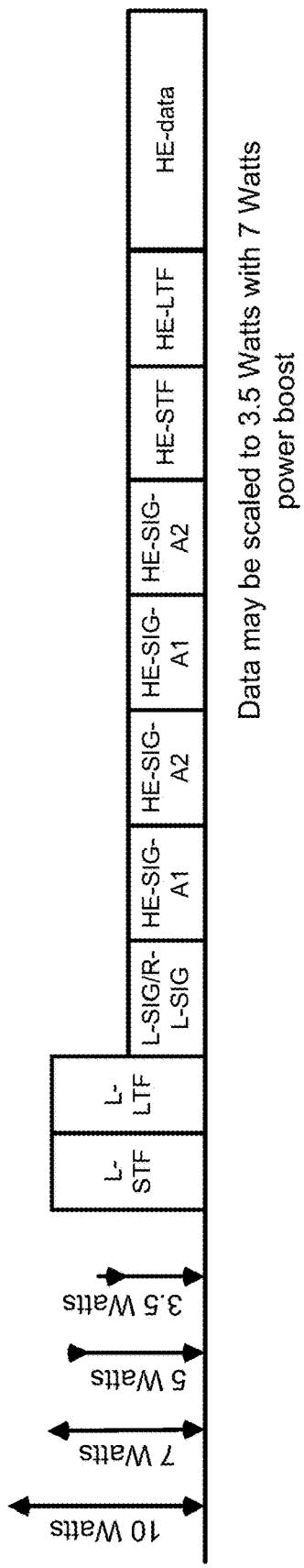
FIG. 13 depicts an example power adjustment due to headroom limitations.
Figure 13:
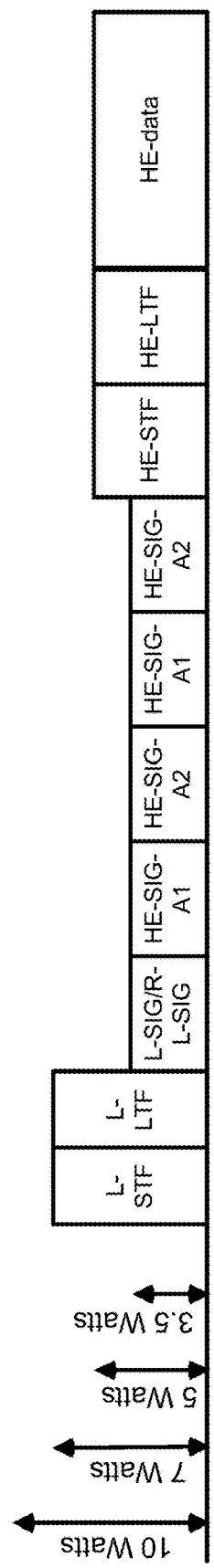

FIG. 13 depicts an example of power adjustment due to headroom limitations. The AP may decide to request that the STA transmit all or part of the PPDU (e.g., excluding the L-STF/L-LTF) with a lower transmit power (e.g., in order to allow the 3 dB of headroom necessary for range extension). The STA may decide (e.g., in response to a request from the AP or autonomously without a request from the AP) to scale the transmit power of the STA (e.g., to ensure that the ratio is kept constant). For example, the STA may transmit at 5 Watts with a headroom of 2 Watts (e.g., the maximum transmit power of the STA may be 7 Watts). Power boosting may require a transmit energy of 10 Watts. The STA may transmit the entire packet at 3.5 Watts with power boosting (e.g., as opposed to transmitting with 5 Watts without power boosting). The STA may transmit a portion of the packet (e.g., before HE-STF) at 3.5 Watts with power boosting (e.g., as opposed to transmitting the portion with 5 Watts without power boosting), and may transmit the remainder of the packet (e.g., starting from the HE-STF) at 5 Watts.

The AP may allow the STA to boost LTF by a value lower than 3 dB. The lower value may be one of a discrete set of values agreed on between a transmitter (e.g., which may be an AP or a STA) and a receiver (e.g., which may be an AP or a STA). The lower value may be signaled (e.g., by a STA to an AP). Signaling may be used to indicate the range extension boost value. The UL MU NDP may use one or more bits to indicate the boosting used in the L-STF and/or L-LTF. The RE response frame may indicate the amount of boosting it is capable of. The AP may send an ACK to acknowledge receipt of the boost level from the STA.

The AP may ensure transmission from the STA by configuring the STA to use UL-OFDMA (e.g., the STA may be configured to use UL-OFDMA only). In such cases, a total transmit power may be scheduled in a smaller bandwidth (e.g., to increase the power spectral density).

Power scaling may be provided for a range extension mode. A STA may transmit using a power that exceeds a maximum power after boosting its L-STF and/or L-LTF by 3 dB. A STA may apply power scaling after it boosts its L-STF and/or L-LTF by 3 dB (e.g., before the STA transmits). The power scaling may maintain a relative power difference between a preamble and data (e.g., such that the same or similar PER performance may be maintained for one or more fields including, for example, L-STF/LTF, L-SIG/RL-SIG and HE-SIG1/HE-SIG1', HE-SIG2/HE-SIG2'). The power scaling may be an automatic STA power scaling (e.g., without AP control). Power scaling may be helpful in multiple aspects of the range extension mode (e.g., in case the AP makes a wrong decision to apply power boosting for L-STF/LTF or range extension).

BSS color may be provided for multiple-BSSs under an AP. In a single BSS scenario, one or more STAs in a BSS may use the BSS color and/or an associated UL/DL bit to enter a power save mode. The one or more STAs in the BSS may use the BSS color and/or an associated UL/DL bit to determine when to set a NAV, when to use one or more OBSS preamble detect thresholds, and/or when to respond to one or more Contention Free-End (CF-END) packets for frame protection.

When multiple-BSSs are under a physical AP, two or more radios may be provided with multiple BSSIDs assigned to each of the two or more radios. Power save and/or spatial reuse may be provided for two or more radios that access the same medium (e.g., the same channel). A STA may identify one or more (e.g., all) of the BSSIDs that may access its medium.

Each BSS may be assigned a separate color. The AP may inform a STA of one or more (e.g., all) BSS-colors that the STA should respond to (e.g., similar to how the STA may respond to its own BSS color). A BSS may be assigned a specific BSS color and/or a BSS color group. For example, one or more (e.g., all) BSSIDs that access the same channel (e.g., medium) may be assigned the same BSS color (e.g., to accommodate the limited number of available BSS colors). The STA may be informed of the BSS color and/or the BSS color group.

A BSS color may be assigned to a (e.g., each) virtual BSS. A physical AP BSS color may be determined based on the BSS color assigned to the virtual BSS. For example, each virtual BSS may be assigned a BSS color and/or a mask. A virtual AP associated with a virtual BSS may comprise a BSS color and/or a mask associated with the virtual BSS. The virtual AP may use an individual color and/or may identify one or more packets that arrive from the physical AP.

FIG. 14 depicts an example multiple-BSSID element format. The multiple-BSS element may be extended to signal one or more BSS colors associated with one or more (e.g., each) BSSs. The one or more BSS colors may be signaled to one or more STAs associated with a physical AP and/or a specific BSS. The multiple-BSSID element may comprise optional sub-elements. One such optional sub-element may be a MaxBSSID Indicator field that may indicate the number of virtual BSSs in a physical BSS. Another optional sub-element may be a BSS color field that may indicate a BSS color of a specific BSS. Another optional sub-element may be a BSS color group field that may indicate a grouping of BSS color. The BSS color group field may be used, for example, when each BSS is assigned a separate BSS-color.

A physical AP BSS color may be provided with a CF-END frame. This may be illustrated in the following example in which a first STA (e.g., STA1) and a second STA (e.g., STA 2) may be associated with a first virtual AP (e.g., BSSID1), and a third STA (e.g., STA3) may be associated with a second virtual AP (e.g., BSSID2). A physical AP (e.g., BSSID0) may be assigned BSS color 0 to indicate that one or more (e.g., all) virtual BSSs are associated with the physical AP on a medium. An example beacon frame may comprise one or more of the following elements: Element ID, Length, MaxBSSID Indicator (e.g., which may be assigned a value of 2), Physical AP BSSID (e.g., which may be assigned a value of BSS0), Physical AP BSS color (e.g., which may be assigned a value of 0); Virtual AP1 BSSID (which may be assigned a value of BSS1); Virtual AP1 BSS color (which may be assigned a value of 1); Virtual AP1 BSS color group (which may be assigned a value of 0); Virtual AP2 BSSID (e.g., which may be assigned a value of BSS2); Virtual AP2 BSS color (e.g., which may be assigned a value of 2); and Virtual BSS color group (e.g., which may be assigned a value of 2).

The first STA may send a request to send (RTS) to the first virtual AP. The physical AP may send a clear to send (CTS) message to the first STA (e.g., while setting the BSS color and/or the physical AP BSSID to 0 in the frame). The respective NAVs of the first STA, the second STA, and the third STA may be set. The first STA may send a CF-END to the physical AP. The second STA may receive (e.g., overhear) the CF-END. The second STA may reset the NAV of the second STA (e.g., upon receipt of the CF-END). The physical AP may send a repeated CF-END (e.g., with the BSS color and/or the BSSID set to 0). The third STA may reset the NAV of the third STA (e.g., upon receipt of the repeated CF-END).

Uplink transmission may be provided with different fragmentation capabilities. An AP may negotiate the fragmentation level for one or more (e.g., each) STAs. The fragmentation level may be set as part of an association request/response frame exchange (e.g., during association of a STA and an AP through an initial access).

The beacon frame and/or probe response frame from the AP may comprise a pre-defined fragmentation level supported by the AP. The level may be defined such as support for a higher fragmentation level may indicate support for a lower fragmentation level (e.g., if a higher fragmentation level is signaled, such signaling may be interpreted as implying support for lower levels as well). The fragmentation level may be a fixed value (e.g., indicating support for only that fragmentation level). The fragmentation level may be varied within a range (e.g., multiple fixed values may be supported).

If the beacon and/or probe response frames indicate an allowance for negotiating, the STA may indicate (e.g., propose) a fragmentation level (e.g., a desired fragmentation level). The fragmentation level may be indicated in an association request frame. The AP may indicate an acceptance or a rejection of the fragmentation level proposed by the STA. For example the AP may set a flag in an association response frame indicating the acceptance or the rejection of the fragmentation level proposed by the STA. If the AP accepts the fragmentation level proposed by the STA, the STA may authenticate and join the network. If the AP rejects the fragmentation level proposed by the STA, the STA may not join the network.

Different STAs may have different fragmentation capabilities. An AP may modify (e.g., dynamically adjust) the fragmentation level based on one or more scheduled STAs. For example, when an AP is associated with multiple scheduled STAs that use different fragmentation levels, the AP may modify the fragment levels of scheduled STAs (e.g., to a same level). The modified fragmentation capability level may be signaled in a trigger frame (e.g., in a trigger frame used to schedule one or more users). A specific fragmentation level (e.g., a fragmentation level specific to a user or a STA) may be signaled in a user- or STA-specific portion of the HE-SIG-B field.

A STA may transmit and/or receive data using a desired fragmentation level. The AP may determine a fragmentation level based on a lowest common fragmentation level of one or more STAs to be scheduled in an uplink transmission. The AP may signal the determined fragmentation level to the one or more STAs.

An HE trigger-based UL NDP PPDU frame may be provided, for example to carry short uplink control and/or management information. The short uplink control and/or management information may comprise a buffer status report. The buffer status report may indicate that the STA has traffic to send. The short uplink control and/or management information may comprise a flag indicating a request to switch to a range extension mode.

Figure 15:
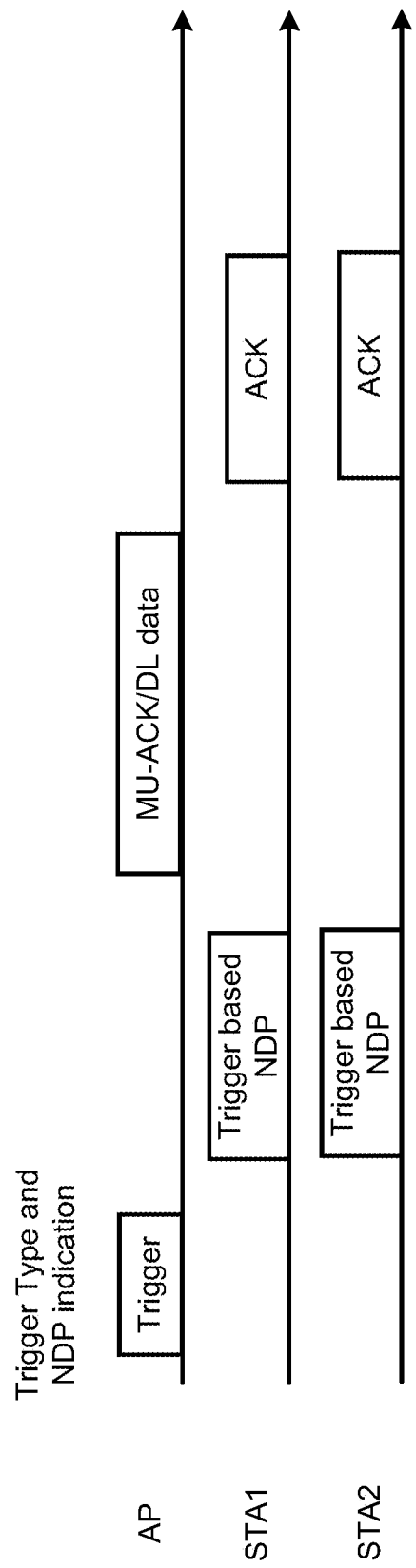
FIG. 15 depicts an example transmission of a trigger-based uplink NDP PPDU.

FIG. 15 depicts an example transmission of a trigger-based UL NDP PPDU. A transmission (e.g., a trigger-based UL NDP PPDU transmission) may be initiated by a trigger frame. An AP may acquire the medium for the transmission by contention and/or scheduling. The AP may transmit the trigger frame. The trigger frame may comprise a MU PPDU format. The trigger frame may comprise a SU PPDU format. The trigger frame may trigger a dedicated UL transmission and/or an UL random access. The trigger frame may initiate one or more trigger-based UL NDP PPDU transmissions from one or more connected STAs. The trigger frame may comprise a trigger type. The trigger type may indicate whether an expected UL frame may be a small control frame or a management frame, for example. The trigger frame may comprise an NDP indication. The NDP indication may be included in a common information field and/or a user-specific information field of the trigger frame.

A STA may receive the trigger frame. Upon reception of the trigger frame, the STA may determine whether the STA is an intended recipient of the trigger frame. If the NDP indication is included in the trigger frame, the STA may prepare an NDP PPDU for a control and/or management frame (e.g., based on the trigger type). If the NDP indication is not included in the trigger frame, the STA may prepare the transmission with a normal MAC frame.

In a trigger-based UL NDP PPDU, an UL transmission from one or more (e.g., all) of the STAs may not comprise a MAC frame. The UL transmission may comprise a SIG field. The SIG field may comprise MAC control and/or management information. The AP may request that a first STA reply with an NDP frame while a second STA reply with a normal MAC frame.

An HE trigger-based UL NDP PPDU frame may comprise a plurality of fields including, for example, an HE-SIG-C field described herein. The HE-SIG-C field may be defined based on a trigger type. For example, the HE trigger-based UL NDP PPDU frame may support one or more of the following UL NDP control/management frames: HE NDP CTS, HE NDP PS-POLL, HE NDP UL Traffic Report, HE NDP UL TXOP Request, and/or HE NDP UL ACK/BA.

The HE-SIG-C field may use an MCS set by the trigger frame. The MCS used by the HE-SIG-C field may be signaled in an HE-SIG-A field. The HE-SIG-C field may be transmitted in a specific RU (e.g., as shown in FIG. 10), and be repeated with phase rotation in one or more of the remaining assigned RUs. The HE-SIG-C field may be transmitted over the assigned RUs. A same HE-SIG-C may be transmitted in each RU and diversity may be achieved by phase rotation. Different HE-SIG-Cs may be transmitted in different RUs dedicated to different users. A hybrid approach may be adopted (e.g., use a same HE-SIG-C and phase rotation in some RUs, and different HE-SIG-Cs in other RUs).

FIG. 16 depicts an example uplink MU-OFDMA NDP frame. The HE-SIG-C field may be transmitted to one or more RUs (e.g., across the entire band). The HE-SIG-C field may be separated by the AP in the spatial and/or code domain. For example, the HE-SIG-C field may be sent in the 64 point FFT region of the HE-PPDU.

Although the features are described herein, each feature or element may be used without other features or in various combinations with or without other features.

Although 802.11 specific protocols are described herein, the features described herein are not restricted to this scenario and may be applied in other wireless systems.

Although SIFS is used to indicate various inter frame spacing in the examples, other inter frame spacing such as RIFS, AIFS, DIFS or other agreed time interval could be applied in the same solutions.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. An access point (AP) comprising:
a transmitter;
a receiver; and
a processor; wherein,
the transmitter and the processor are configured to transmit, to a plurality of stations (STAs), a trigger frame including a trigger type field indicating a type of expected uplink (UL) frames from the plurality of STAs is null data packet (NDP) and a field indicating a Basic Service Set (BSS) Identifier (BSSID); and
the receiver and the processor are configured to receive, from a first STA of the plurality of STAs on a condition that the first STA is an intended recipient of the trigger frame, a first NDP frame carrying UL feedback information including at least a feedback report, wherein the first STA is an intended recipient of the trigger frame if the BSSID is a Medium Access Control (MAC) address of the AP or if the BSSID corresponds to one of a plurality of virtual BSSs associated with the AP and the STA is associated with at least one of the plurality of virtual BSSs.

2. The AP of claim 1, wherein the trigger type field is in a common information field of the trigger frame.

3. The AP of claim 1, wherein the trigger type field is in a user-specific information field of the trigger frame.

4. The AP of claim 1, wherein the first NDP frame further includes an UL resource request.

5. The AP of claim 4, wherein the UL resource request is an UL TXOP request.

6. The AP of claim 1, wherein the first NDP frame is a small control frame or a management frame.

7. The AP of claim 1, wherein the feedback report is an UL traffic report.

8. The AP of claim 1 wherein the first STA is a high-efficiency (HE) STA.

9. The AP of claim 1, wherein the AP supports two or more Basic Service Sets (BSSs).

10. A method performed by an access point (AP), the method comprising:
transmitting, to a plurality of stations (STAs), a trigger frame including a trigger type field indicating a type of expected uplink (UL) frames from the plurality of STAs is null data packet (NDP) and a field indicating a Basic Service Set (BSS) Identifier (BSSID); and
receiving, from a first STA of the plurality of STAs on a condition that the first STA is an intended recipient of the trigger frame, a first NDP frame carrying UL feedback information including at least a feedback report, wherein the first STA is an intended recipient of the trigger frame if the BSSID is a Medium Access Control (MAC) address of the AP or if the BSSID corresponds to one of a plurality of virtual BSSs associated with the AP and the STA is associated with at least one of the plurality of virtual BSSs.

11. The method of claim 10, wherein the trigger type field is in a common information field of the trigger frame.

12. The method of claim 10, wherein the trigger type field is in a user-specific information field of the trigger frame.

13. The method of claim 10, wherein the first NDP frame further includes an UL resource request.

14. The method of claim 13, wherein the UL resource request is an UL TXOP request.

15. The method of claim 10, wherein the first NDP frame is a small control frame or a management frame.

16. The method of claim 10, wherein the feedback report is an UL traffic report.

17. The method of claim 10, wherein the first STA is configured as a high-efficiency (HE) STA.

18. The method of claim 10, wherein the AP supports two or more Basic Service Sets (BSSs).

* * * * *